United States Patent [19]

Nishikawa

[11] 4,087,174
[45] May 2, 1978

[54] COLOR CORRECTION METHOD FOR PANCHROMATIC PRINTING AND ITS DEVICE

[76] Inventor: Naoji Nishikawa, 5-43 Nishihara-cho 4-chome, Tanashi-shi, Tokyo, Japan

[21] Appl. No.: 684,394

[22] Filed: May 7, 1976

[30] Foreign Application Priority Data

May 15, 1975 Japan .................................. 50-58382

[51] Int. Cl.² ........................ G03B 27/32; G03B 27/52
[52] U.S. Cl. ........................................ 355/32; 355/71; 355/77; 355/88
[58] Field of Search ........................ 355/32, 77, 71, 35, 355/88

[56] References Cited

U.S. PATENT DOCUMENTS

| | | | |
|---|---|---|---|
| 3,672,766 | 6/1972 | Levy | 355/32 |
| 3,748,045 | 7/1973 | Mitchell | 355/32 X |
| 3,967,897 | 7/1976 | Rogers | 355/32 |

Primary Examiner—Richard A. Wintercorn
Attorney, Agent, or Firm—Blanchard, Flynn, Thiel, Boutell & Tanis

[57] ABSTRACT

A photographed and developed panchromatic negative film is mounted on an enlarger. White light will, after passing through this panchromatic negative film, be mixed up uniformly in a diffuser. This mixed-up light will print on panchromatic paper each colored image of cyan, magenta and yellow through each color filter in a fixed grade density of red, green and blue-violet. Of these printed images the differences between an image at the least visible section and other images will be indicated as an unbalance in the three primary colors. Then, a color filter for color correction corresponding to this unbalance will be selected. Next, removing the diffuser from the enlarger, alternatively the selected color correction filter will be mounted thereon. Again, when a panchromatic negative film is printed on panchromatic paper, a positive picture that will balanced in the three primary colors can be obtained.

10 Claims, 13 Drawing Figures

COLOR CORRECTION METHOD FOR PANCHROMATIC PRINTING AND ITS DEVICE

BACKGROUND OF THE INVENTION

The present invention relates to a color correction method and its device for panchromatic printing. Most recently panchromatic photographs have come to be handled easily by amateurs in accompaniment with the rapid progress in light-sensitive materials, development of 2 bath developer and popularization of panchromatic paper. The most serious problem still now existing in case of performing color printing, however, lies in delicate and complex color correction in reproducing colors. It might be solely said that whether a color print is good or not depends upon such color correction. Since a panchromatic negative film contains infinite factors determining various colors on respective prints photographed under different conditions, it would be extremely difficult for even a considerably experienced person to judge whether the balance among yellow, magenta and cyan in the three primary colors is well maintained or not only at a glance at such panchromatic negative film.

SUMMARY OF THE INVENTION

Conventionally, the most primitive method of color correction is to print a panchromatic negative film into a positive one as it is, or to print it into a positive film by the use of color correction filters selected by while perception and experience, then to print again by attempting of balance the three primary colors in said positive film, e.g. when yellow is too strong as a whole, by using red and blue-violet color filters so as to weaken the yellow color. Such operation will be repeated for the number of times required reach the condition of the three primary colors being well balanced. Accordingly, it will take a long time until the best condition has been found, developer and panchromatic papers will be wasted, and also the developer will become fatigued.

An object of the present invention is to detect quantitatively the amount of unbalance in the three primary colors of a panchromatic negative film to be printed through a one-time trial process. For this purpose, the present invention is, after white light has passed through a panchromatic negative film, to mix it up uniformly in a diffuser, tentatively process through red, green and blue-violet color filters so that a transmission density will become a predetermined grade by said mixed light, and of these colored images, detect quantitatively the amount of unbalance indicated by the differences between an image at the least visible section and the other images, then to print panchromatically using correction filters selected on the basis of the above results. Consequently, it is possible to select an extremely exact color correction filter.

Another object of the present invention is to provide a very cheap device. At specific large-scale developing works they are using electronic-optical measuring instruments, but these instruments are so expensive that these are not yet prevailing in general. And yet even if these instruments are in use, tests must be repeated several times under the same condition, which will still take a considerable time, and, furthermore, as far as a panchromatic photograph is the one which is looked at by human being, eventually it must be corrected further with human eyes. The present invention is intended to use a normal enlarger fitted with a color scale formed by triplicating color filters composed of red, green and blue-violet, neutral density wedges whose transmission densities will become higher gradually in a fixed grade and masks provided with a transparent section in the same grade as in the wedges, and a diffuser filter. Accordingly, it is extremely cheap, so that any amateur can purchase it. A still further object of the present invention is to provide a device which is easy to operate, and yet can detect and correct a balancing condition of a panchromatic negative film as a whole.

Mosiac filters such as shown in FIG. 1 are in use. The mosaic filters are filters in which cyan, magenta and yellow (hereinafter referred to as C, M and Y respectively) axes are positioned in 3 directions at angular intervals of 120° about zero as a center, thus producing a combination of the 2 primary colors system, and also R.G.B. in the three primary colors of light can be obtained by $Y + M = R$ (red), $Y + C = G$ (green) and $M + C = B$ (blue-violet) due to a combination of equivalences, and further from these 6 basic color phases can be obtained intermediate colors, and still further density of grey is increased gradually outward from the center point. One way to correct an unbalance in the three primary colors has been to print a panchromatic negative film through this mosaic filter, then attempt to visually judge which position is to be considered most proper in the lattices of the positive film and then select a filter equvalent to that lattice. It is extremely difficult to select the best location from the very small lattice sections of, more than 100 in number, which differ delicately. For instance, in a picture of a person, when a location that a balance in colors is considered best is a background or a part of hairs, judging the whole photograph by a lattice section which is only a part of to the whole photograph is extremely difficult, so such method is not yet prevailing. In constrast, the present invention is to mix up all the light passing through panchromatic negative filters uniformly by a diffuser, print this after disintergrating into the 3 primary colors, then to select color correction filters according to an unbalance in the 3 primary colors, thereby the object of the present invention can be achieved. A still further object of the present invention is to set a proper exposure time and an opening rate of an aperture for a lens in correspondence to a condition of a panchromatic negative film, and for this purpose an embodiment in accordance with the present invention is provided with a color density measuring filter in addition to a 3-color unbalance detecting filter. A still further object of the present invention is to form simply neutral density wedges to provide density differences in fixed grade in color filters of red, green and blue-violet. More specifically, marketed color filters of red, green and blue-violet are not always identical in transmission density. For this reason, the present invention is designed in such a manner that neutral density wedges of a fixed grade are provided in more grades than required for selection of color filters and the transmission densities of respective color filters are made equivalent to each other by the use of such neutral density wedges wherein the wedges differ in density by fixed amounts corresponding to the different transmission densities of the respective red, green and blue-violet color filters.

DESCRIPTION OF THE INVENTION

Methods of color correction for panchromatic (color) prints are in principle roughly divided into the additive process and the diminutive (substractive) process. The additive process is such a method that 3 types of filters which transmit each color light of red, green and blue-violet obtained by trisecting a visible spectrum zone almost evenly are made, and then color correction is performed while an exposure time is adjusted using these 3 types of filters in turn. The diminutive process is such a method that filters of cyan, magenta and yellow which are in the complementary color relation to red, green and blue-violet respectively and have color differences in a fixed grade are provided in a plural number, among which filters of one or two colors are overlapped, respective color elements absorb red, green and blue-violet respectively from illuminating white light, thus permitting various colors to pass through according to the amount of absorption to perform color correction. And in the present invention the latter diminutive process will be adopted.

Figure 1:
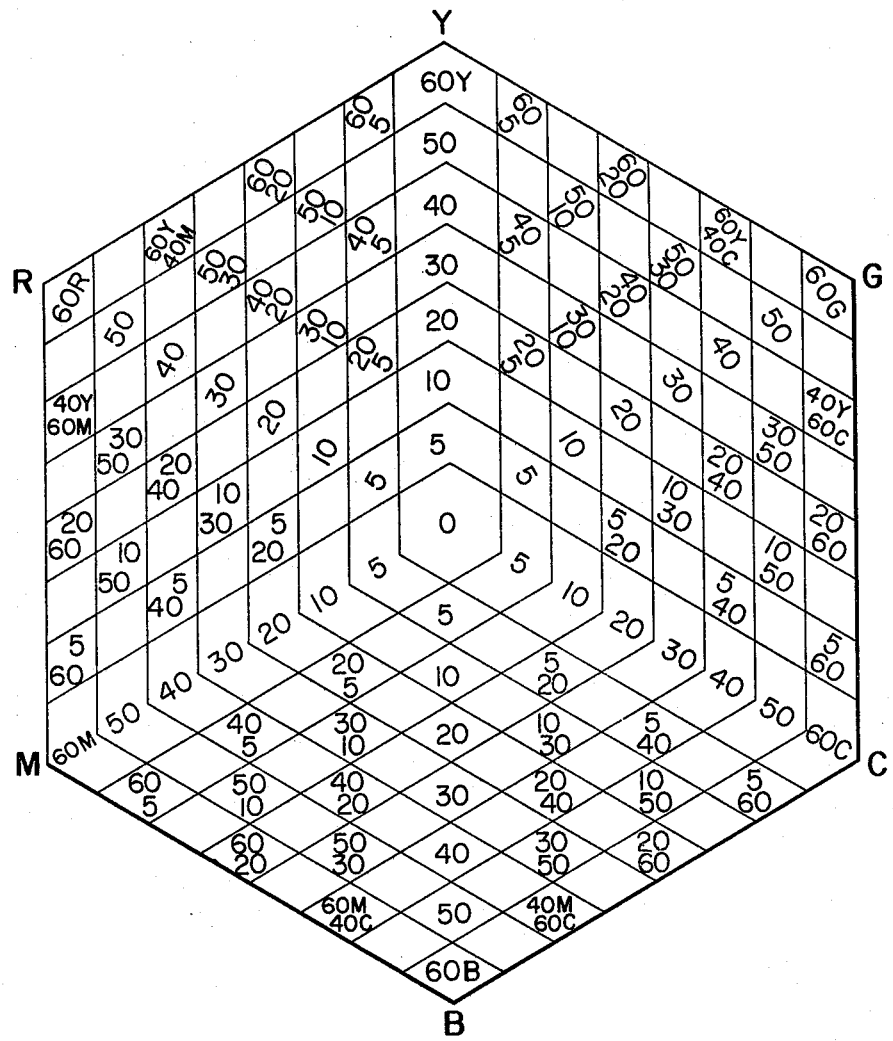
FIG. 1 is a plan view of a mosaic filter used conventionally for color correction.
Figure 2:
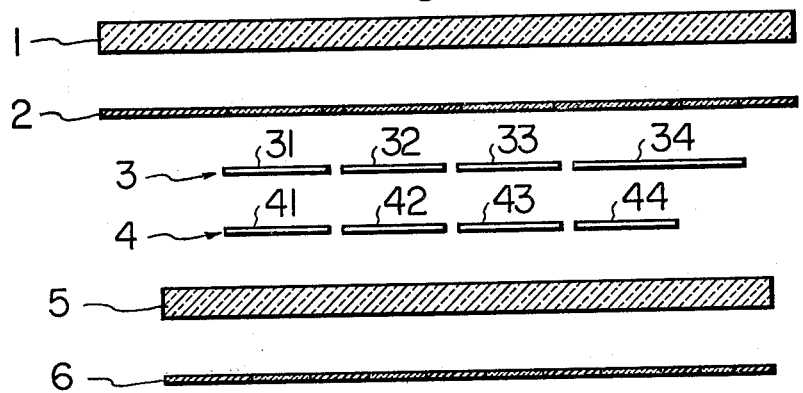
FIG. 2 is an exploded longitudinal section view of a device in accordance with the present invention.
Figure 3:
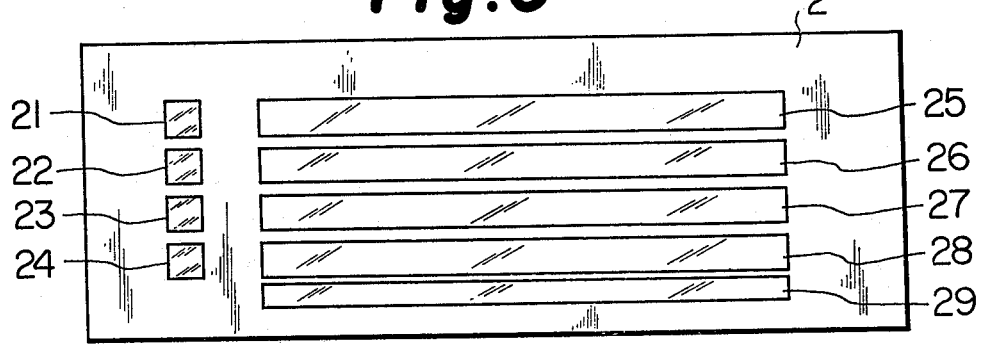
FIG. 3 is a plan view of a mask.

A concrete embodiment will be described in accordance with the accompanying drawings, in which:

in FIG. 2, from the upon, numeral number 1 designates a protective transparent plate made of acrylic resin, 2 designates a film-type mask or a mask printed on said transparent plate 1, 3 designates a group of color filters, 4 designates a group of neutral density wedges, 5 designates a protective transparent plate made of acrylic resin, 6 designates patterns in film typed or printed on said transparent plate 5. The afore-mentioned mask 2 has, as shown in FIG. 3, a few rows of light-transmission parts 21 and the parts except these transmission parts are perfectly light-tight ones.

Figure 4:
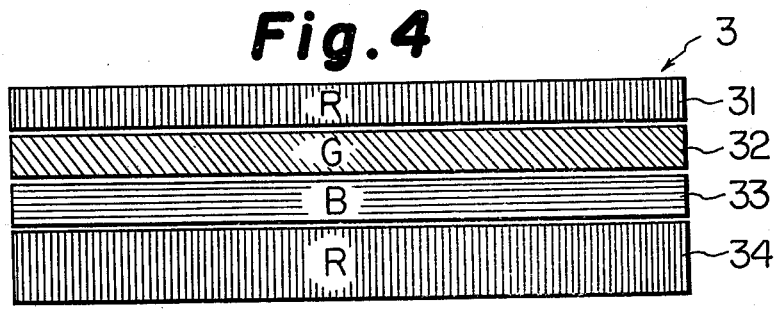
FIG. 4 is a plan view of a color filter.
Figure 5:
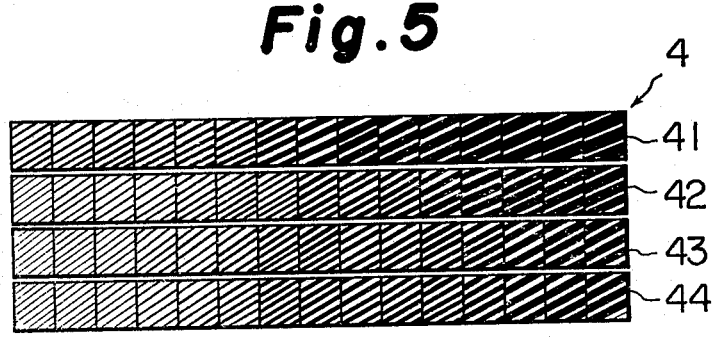
FIG. 5 is a plan view of a neutral density wedge.
Figure 8:
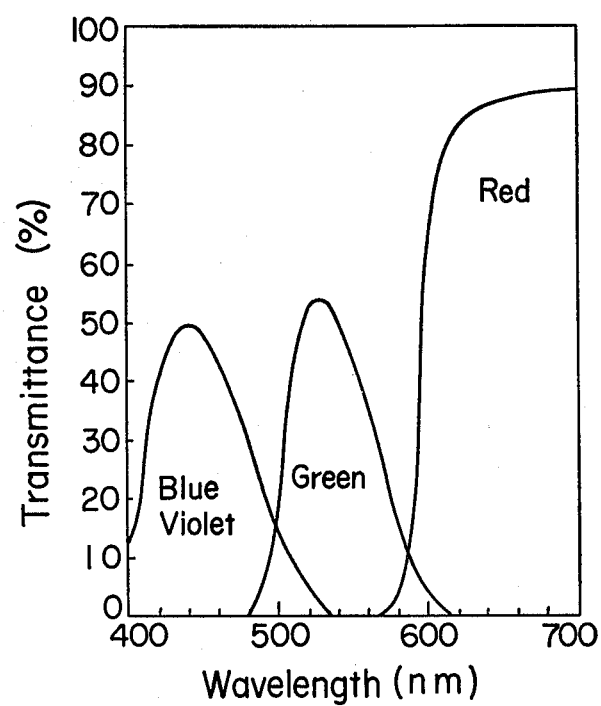
FIG. 8 is a characteristic curve of color filters.

A group of said color filters 3 are, as shown in FIG. 4, composed of each color filter 31, 32 and 33 of red, green and blue-violet in 3 rows for the purpose of obtaining a cyan color image (C), magenta color image (M) and yellow color image (Y). Concretely, for red filter 31 is used a marketed filter which transmits light of more than 600 nm as shown in the characteristic chart of FIG. 8 and having a transmission density of 0.17, for green filter 32 is used a marketed filter which transmits light of 500 – 600 nm as shown in the characteristic chart and having a transmission density of 0.71, and for blue-violet filter 33 is used a marketed filter which transmits light of 400 – 500 nm as shown in the characteristic chart of FIG. 8 and having a transmission density of 0.76. In an embodiment of the present invention, a group of color filters 3 is arranged in the order of red filter 31, green filter 32 and blue-violet filter 33. This is based on the fact that the emulsion layer of recent panchromatic paper consists of cyan color forming layer on the uppermost layer, magenta color forming layer on the middle layer and yellow color forming layer on the lower layer, but this order will not always be observed. The other filter 34 of a group of color filters 3 is for determining density of a negative film and also for determining density to set an exposure time for enlargement and to confirm an opening of an aperture. For this filter 34 for determining is used a red filter. This is due to the fact that said red filter will not be affected by short wave light and C color image will appear most clearly of each color image of C, M, and Y and also is easy to be identified. The device is not limited in this red filter, but it may be a transparent one, but in this case it tends to be somewhat discernible.

Figure 6:
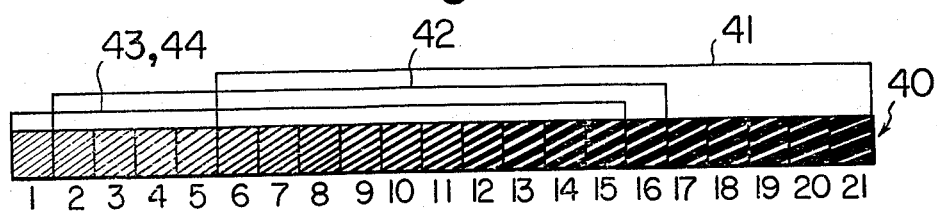
FIG. 6 is also a plan view of a neutral density wedge.

The afore-mentioned density wedge group 4 is formed in 15 stages by arranging in such a way that transmission densities will become higher in a fixed grade (i.e. in fixed steps of gradations). In the grading arrangement for this density, it shall be arranged so as to conform with a variation in grading density of a color correction filter selected in color correction on the market. In this preferred embodiment, if any density of the density wedge 4 varies by 1 grade, it is so designated that a color correction filter will be equivalent to one with its density being different by 0.10. As described above, it is equipped with a red filter 31 with a transmission density of 0.17, a green filter 32 with that of 0.71 and a blue-violet filter 33 with that of 0.76. Accordingly, the density wedges 41, 42 and 43 overlapped by these filters cannot be used with the same ones. For this reason, as shown in FIG. 6, a neutral density wedge 40 with about 0.1 difference steps in transmission density and having 21 grades or steps, will be made. A practically measured value of this density wedge 40 will be as follows:

| Grade | 1 | 2 | 3 | 4 | 5 | 6 |
|---|---|---|---|---|---|---|
| Permeable density | 0.06 | 0.10 | 0.18 | 0.28 | 0.37 | 0.48 |
| | 7 | 8 | 9 | 10 | 11 | 12 |
| | 0.60 | 0.71 | 0.80 | 0.89 | 0.99 | 1.08 |
| | 13 | 14 | 15 | 16 | 17 | 18 |
| | 1.20 | 1.30 | 1.40 | 1.50 | 1.60 | 1.69 |
| | 19 | 20 | 21 | | | |
| | 1.80 | 1.90 | 2.00 | | | |

For red filter 31 are used 15 grades from 7 to 21, for green filter 32 are used 15 grades from 2 to 16, and for blue-violet filter 33 are used 15 grades from 1 to 15. As a result, the variations in density grade of each filter 31, 32 and 33 of said red, green and blue-violet will be almost same at each grade.

| | Red filter | Green filter | Blue-Violet filter |
|---|---|---|---|
| 1 | 0.82 | 0.81 | 0.77 |
| 2 | 0.86 | 0.89 | 0.88 |
| 3 | 0.94 | 0.99 | 0.97 |
| 4 | 1.04 | 1.08 | 1.06 |
| 5 | 1.13 | 1.19 | 1.16 |
| 6 | 1.24 | 1.31 | 1.25 |
| 7 | 1.36 | 1.42 | 1.37 |
| 8 | 1.47 | 1.51 | 1.47 |
| 9 | 1.56 | 1.60 | 1.57 |
| 10 | 1.65 | 1.70 | 1.67 |

-continued

|    | Red filter | Green filter | Blue-Violet filter |
|----|------------|--------------|--------------------|
| 11 | 1.75       | 1.79         | 1.77               |
| 12 | 1.84       | 1.91         | 1.86               |
| 13 | 1.96       | 2.01         | 1.97               |
| 14 | 2.06       | 2.11         | 2.07               |
| 15 | 2.26       | 2.25         | 2.22               |

In this case, it is desirable that the difference in density at each grade in each filter 31, 32 and 33 be exactly 0.10, but such density wedge is very difficult to obtain and practically so much exact accuracy will not be required.

As mentioned before, the density wedges 41, 42 and 43 will use only 15 grades within a determined range of the density wedges of 21 grades as transmission density of each filter 31, 32 and 33 differ respectively, thus attempting to permit all the transmission densities to be agreed with approximately. However, this can be performed by other methods. That is to say, use density wedges of the same density difference having triple width, wherein additionally, for red filter 31 is used a fine adjusting neutral density filter with a transmission density of 0.60 and for green filter 32 a same with that with 0.05, both of which are added and overlapped. Then, arrange them in the same transmission density. In this method, however, it has such drawback that the arrangement will be somewhat more expensive. 44 is a density wedge for determining density, for which the density wedge 40 with a range of 1 to 15 grades as shown in FIG. 6 will be used. It is designated to measure light of the average density by mixing differences in density of a negative film uniformly by means of a diffuser, provide an exponent by integrating the effects of the sensitivity of light-sensitive material, the intensity of light source for enlargement and the characteristic of the treating chemical, and enable determination of the value of aperture opening to be used.

Figure 7:
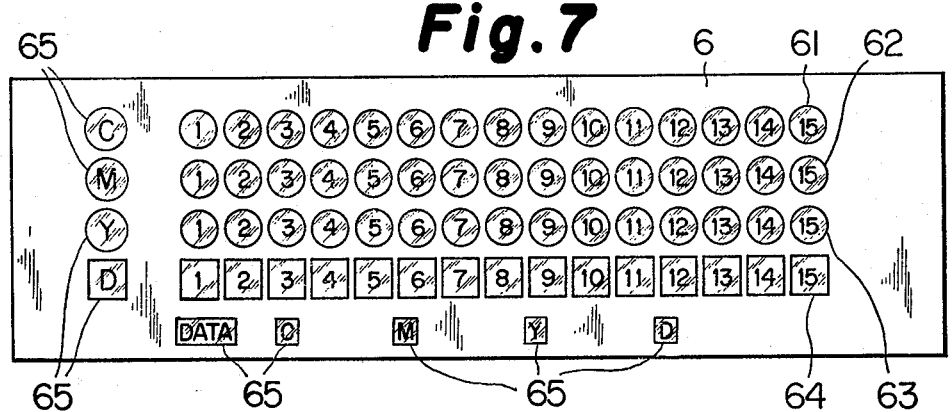
FIG. 7 is a plan of a pattern film.

Next, the before-mentioned pattern film 6 is, as shown in FIG. 7, formed in such a manner that circular light-transmitting sections 61, 62 and 63 are arranged in 3 lateral rows by conforming said film with each grade of the before-mentioned density wedges 41, 42 and 43, numerals from 1 to 15 are printed on each light-transmitting section 61, 62 and 63 respectively, and rectangular light-transmitting section 64 is formed by conforming with each grade of said density wedge 44. Inside the parts of section 64 the respective numerals 1 to 15 are printed. Further, on the left-hand end of pattern film 6 is formed a light transmitting section 65 which transmits light as characters of C, M, Y and D, while on the lower part is formed the same section which transmit light as characters of DATA, C, M, Y and D.

Figure 9:
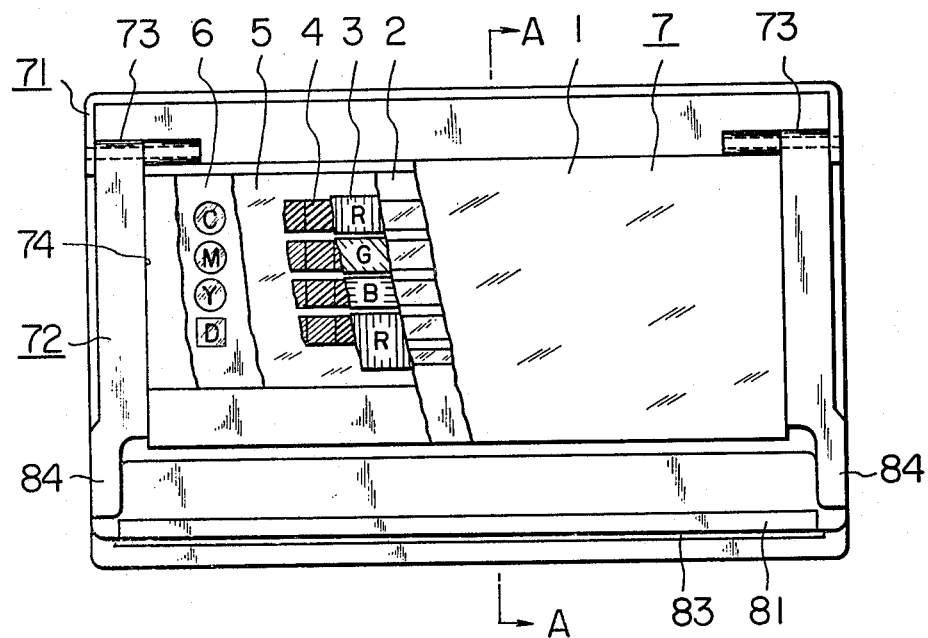
FIG. 9 is a front view of the device with a part cut away according to the present invention.
Figure 10:
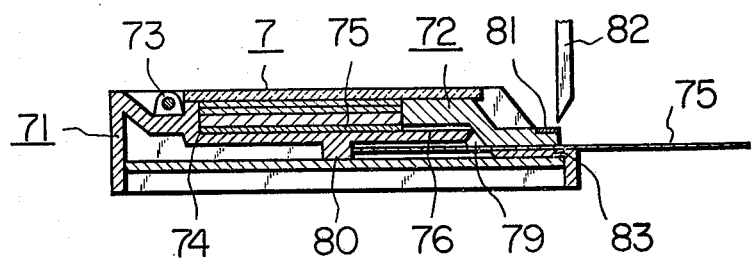
FIG. 10 is a cross-sectional view of the device taken on the line A—A according to the present invention.
Figure 11:
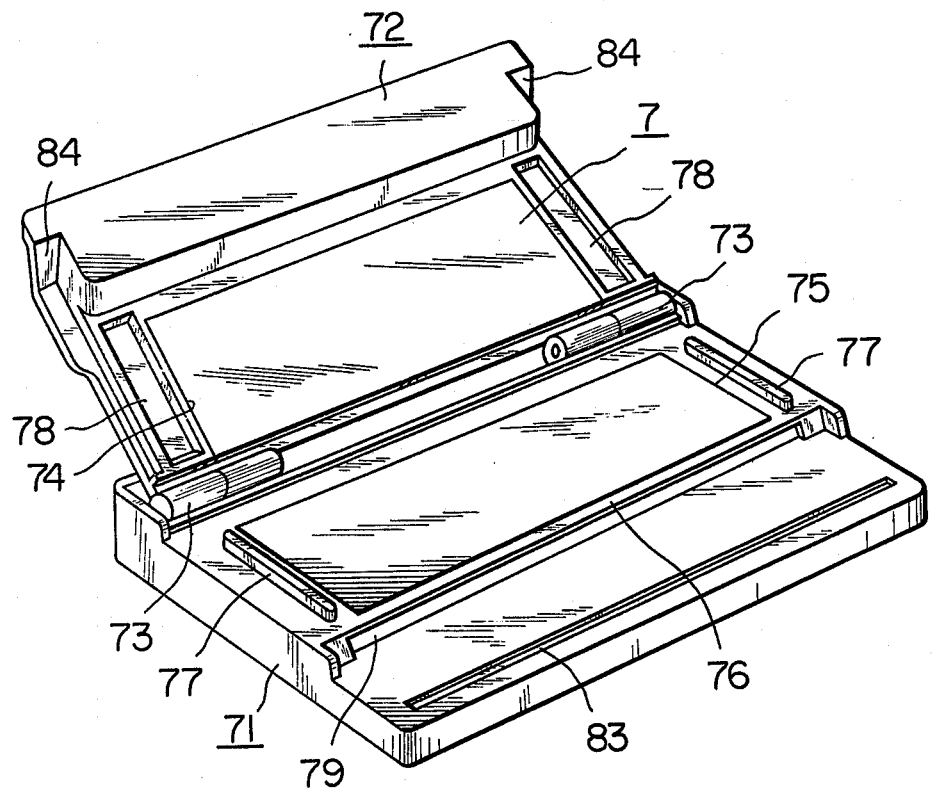
FIG. 11 is a perspective view of the device according to the present invention.

Each part in the foregoing is bonded in a stack in the order of FIG. 2 to be formed into one plate. This will be referred to as a color scale 7 temporarily. This color scale 7 will be incorporated in such a device as shown in FIG. 9 to FIG. 11. That is, 71 is a base, on the upper surface of which a cover 72 is movably mounted with a hinge 73 to open and close freely. In the center of this cover body 72 is formed a rectangular opening 74, into which said color scale 7 in fitted and secured by bonding agent.

The upper surface of the base 71 is used as a loading table 76 for a panchromatic printing paper 75 and on both sides of the surface are installed projected guide rails 77 and 77, and on the lower surface of the cover body 72 are provided recessed grooves 78 and 78 located corresponding to said guide rails 77 and 77. In the stepped part on the upper surface of the base 71 is formed a long hole 79, into which a printing paper 75 will be inserted until it contacts a projection 80 on the lower surface and will be covered with the cover body 72, then a knife 82 will cut said printing paper 75 in a fixed width by moving the knife along the proove on the upper surface of the base 72 keeping it in contact with a mating edge 81. On the corner of the cover body 72 is provided a handle 84 to open the cover body 72.

Now, the color correction method will be described hereunder.

Figure 12:
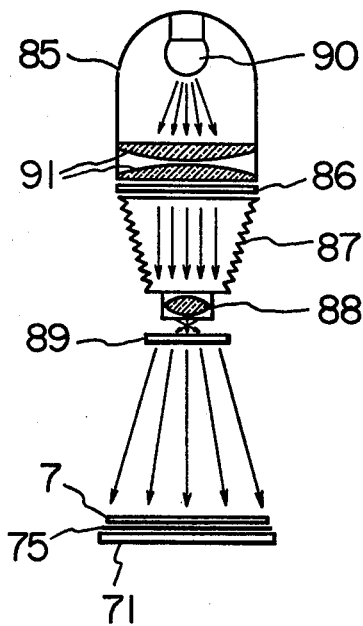
FIG. 12 is a sketch of an enlarger when printing by the use of the device according to the present invention.

In FIG. 12, a panchromatic negative film 86 to be enlarged or a standard panchromatic negative film whose Y, M and C are of the same grade will be inserted into an enlarger 85.

Figure 13:
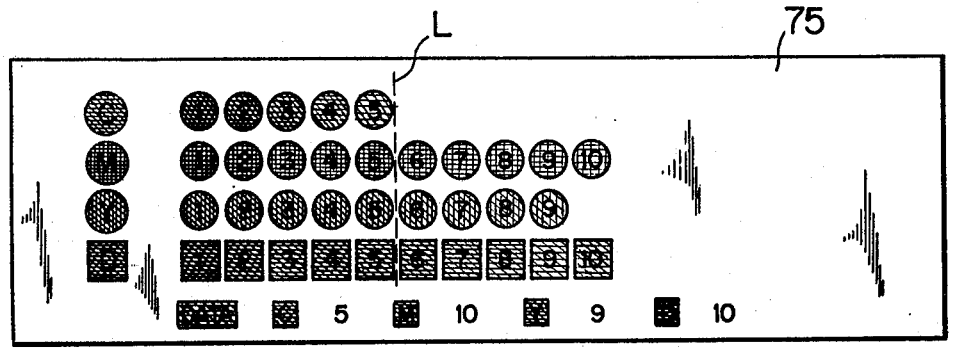
FIG. 13 is a plan of a positive film printed by the use of the device according to the present invention.

Then, determine a size of enlargement, adjust the focus by moving a bellows 87 and an enlarging lens 88 up and down and set an aperture to the desired size. Further, put a panchromatic paper 75 on the loading table of the base 71 and then superimpose the cover body 72 fitted with said color print scale 7 on it. After installing a diffuser 89 such as a diffusing filter and turning on light source 90, then white light will pass through a panchromatic negative film 86 or a standard panchromatic negative film by way of a condenser lens 91 and then the enlarging lens 88, where the light passing through the latter is mixed up in a diffuser 89, the mixed-up light being exposed to a panchromatic paper 75 after transmitting the color print scale 7. After the paper is exposed for a fixed time, it will be developed in the normal panchromatic paper treatment and then dried up after rinsing. Under such processes, the positive 75 as shown in FIG. 13 can be obtained. That is, it is assumed that observation could be made with naked eyes up to $C = 5$, $M = 10$ and $Y = 10$. Since values of C, M and Y appeared in this positive print 75 will vary delicately depending upon light source 90, panchromatic negative film 86, panchromatic paper 75, quality of developer, etc., it is desirable that in subsequent processes the light source 90, panchromatic paper 75 and developer used would be the same ones as in producing a positive print 75 for determining color correction.

In such a manner, taking as a basis the least C color image of each color image of C, M and Y appeared in a positive print 75, draw a line (L) vertically. Practically, it is found that in most cases C is the least one. When reading the values of M and Y beyond (to the right of) this line (L), M is 5 pieces and Y is 4 pieces. Accordingly, it will be found that as a color correction filter, M50 (effective density = 0.50) and Y40 (effective density = 0.40) should be used in principle. After applying the color correction filters of M50 and Y40 on an enlarger, expose to light a panchromatic paper 75 to be developed. The exposure time and aperture in this case will be determined based on such data as the value of D is 10.

When such positive print 75 as shown in FIG. 13 by a standard panchromatic negative film is obtained, many experiments have proved that almost no color correction is needed provided the afore-mentioned color correction filters of M50 and Y40 will be in use. But in the case of obtaining a positive print 26 by the color print scale 16 using photographed panchromatic negative film 22 and also in the case a specific color appears in an area particularly large in a size or appears particularly strongly in this panchromatic negative film 22, it would be necessary to correct somewhat the color correction film determined in the above-described method. In this case, when providing four different combinations of color correction filters consisting of M60 and Y50 of one grade higher density in addition to the aforementioned M50 and Y40 (that is, four combinations of of color correction filters consisting of M50 and Y40), M60 and Y50, M50 and Y50, and M60 and Y40 and then printing by use of respective ones of these filter combinations, then the best combination is included among these four combinations. This fact is confirmed by a lot of data. It might be considered that a combination of M40 and Y30 (each having one grade lower density than M50 and Y40) will be required, but in the results of experiments, there hardly occurred such case.

In the above-mentioned preferred embodiment, 3 kinds of R, G and B color filter 31, 32 and 33 have all been made in the same density, but, should a standard point of density determination be provided separately, color filters of different density may be used respectively.

What I claim is

1. In a method for making panchromatic prints from a panchromatic negative film by the subtractive process, the steps comprising:

passing a white light through a panchromatic negative film;

mixing up uniformly by means of a diffuser said passed white light;

passing said mixed up light through first, second and third side-by-side filters respectively of first, second and third subtractive primary colors, each of said first, second and third filters being graded in several steps from relatively low to relatively high density;

performing panchromatic printing with the light passed by said filters and producing a test color print carrying for each of said first, second and third subtractive primary colors a series of color sections stepped in decreasing color intensity down to a least visible section, wherein the number of visible sections may differ as between said first, second and third colors;

detecting the number of visible sections by which the series with the fewest visible sections is exceeded by each of the other two and with these numbers selecting color correction filters.

2. Method of claim 1, in which said step of passing light through said filters includes arranging the graded filter steps for each color in a row, arranging the rows for said three subtractive primary colors side-by-side, and arranging a fourth row of neutral density steps side-by-side therewith and passing of said mixed up light through said four rows of graded density steps of first, second and third primary colors and neutral density, respectively, color and neutral steps of equal density being arranged side-by-side transversely of said rows, said step of detecting including finding the shortest of the three color step rows on the test print and counting the number of visible steps extending therebeyond in each of the other two color rows.

3. The method of claim 2, in which said step of passing light through filters includes passing of light through red, green and blue-violet filters.

4. A color correction device, comprising:

first, second and third color filter strips respectively of first, second and third primary colors, each of said first, second and third filter strips having substantially uniform color density throughout its length, said first, second and third color filter strips being arranged side-by-side in nonoverlapping relation;

a neutral density wedge in superposed relation with each of said first, second and third color filter strips, each neutral density wedge including a series of increasing density steps distributed progressively along the length of its corresponding color filter strip, the number of color density steps for a given one of said first, second and third colors being the number of neutral density wedge steps in said superposed relation with said color filter strip;

substantially opaque pattern sheet means in superposed relation with said first, second and third color filter strips and also with said neutral density wedge of each thereof, said pattern sheet means having light transmitting sections superposed on corresponding wedge steps for each of said first, second and third color filter strips and thereby providing a row of light transmitting sections for each said color filter strip, said color filter strips, neutral density wedges and pattern sheet means being superposed as a single unit.

5. A color correction device according to claim 4, including a further density wedge laterally offset from said superposed color filter strips and having density steps corresponding to those of said neutral density wedges superposed with said color filter strips, both as to density and extent along said rows, said pattern sheet means including a further row of light transmitting sections superposed on said steps of further density wedge, for determining density.

6. A color correction device according to claim 4, in which said neutral density wedges differ from each other in transmitting density in correction for differences in transmitting density between the said first, second and third color filter strips, the combined density of color strip and neutral density wedge step at a given light transmitting section superposed on said first color filter strip being substantially identical to the combined density through an adjacent section superposed on said second and third color filter strips, despite differences in density as between said first, second and third color filter strips.

7. A color correction device according to claim 4, in which said color filter strips are straight and lie in close spaced parallel relation to each other, said neutral density wedge steps for each color strip accordingly being disposed in a straight line, said rows of light transmitting section similarly being straight.

8. A color correction device according to claim 4, in which said color filter strips are disposed side-by-side in one layer, said neutral density wedges are disposed side-by-side in another layer and said pattern sheet means provides still another layer, and further comprising, in order, a protective transparent layer, an opaque mask layer with elongate light transmitting windows extending substantially the width and at least the length of said rows of said pattern sheet means, and a further transparent protective layer, said layers being arranged in the order of said first mentioned transparent protective layer, said mask, said color filter strip layer, said neutral density wedge layer, said further protective transparent layer and said pattern sheet means layer and secured in snugly stacked relation to form a color scale of platelike form.

9. A color correction device according to claim 4, including a color scale of multilayer platelike form in which said color filter strips comprise one layer, said neutral density wedges another, and said pattern sheet means another, said color correction device further including a base, a cover mounted on said base for opening and closing, said cover having an open central portion fixedly occupied by said color scale, said base having an upper surface for supporting a piece of panchromatic print paper directly and snugly beneath the cover closed position of said color scale.

10. A color correction device according to claim 9, in which said base incorporates a wide area but vertically thin slot in a portion of said base below said upper surface, said slot opening sidewardly from said base for receiving therein a width of paper corresponding to the width of said color scale, said body at the opening of said slot including a knife guide for cutting off a piece of photographic paper entering said slot at a width corresponding to the depth of said slot, for use as a test paper to be disposed beneath the cover.

* * * * *